(No Model.)  
L. ROADHOUSE.  
LISTER PLOW AND PLANTER.  
No. 489,037.    Patented Jan. 3, 1893.

(No Model.)

L. ROADHOUSE.
LISTER PLOW AND PLANTER.

No. 489,037.

4 Sheets—Sheet 4.

Patented Jan. 3, 1893.

Fig. 4.

UNITED STATES PATENT OFFICE.

LEVI ROADHOUSE, OF MONMOUTH, ILLINOIS, ASSIGNOR TO THE WEIR PLOW COMPANY, OF SAME PLACE.

LISTER PLOW AND PLANTER.

SPECIFICATION forming part of Letters Patent No. 489,037, dated January 3, 1893.

Application filed August 1, 1891. Serial No. 401,419. (No model.)

*To all whom it may concern:*

Be it known that I, LEVI ROADHOUSE, a citizen of the United States, residing at Monmouth, in the county of Warren and State of Illinois, have invented certain new and useful Improvements in Lister Plows and Planters, of which the following is a specification, reference being had to the accompanying drawings, in which—

Figure 1:
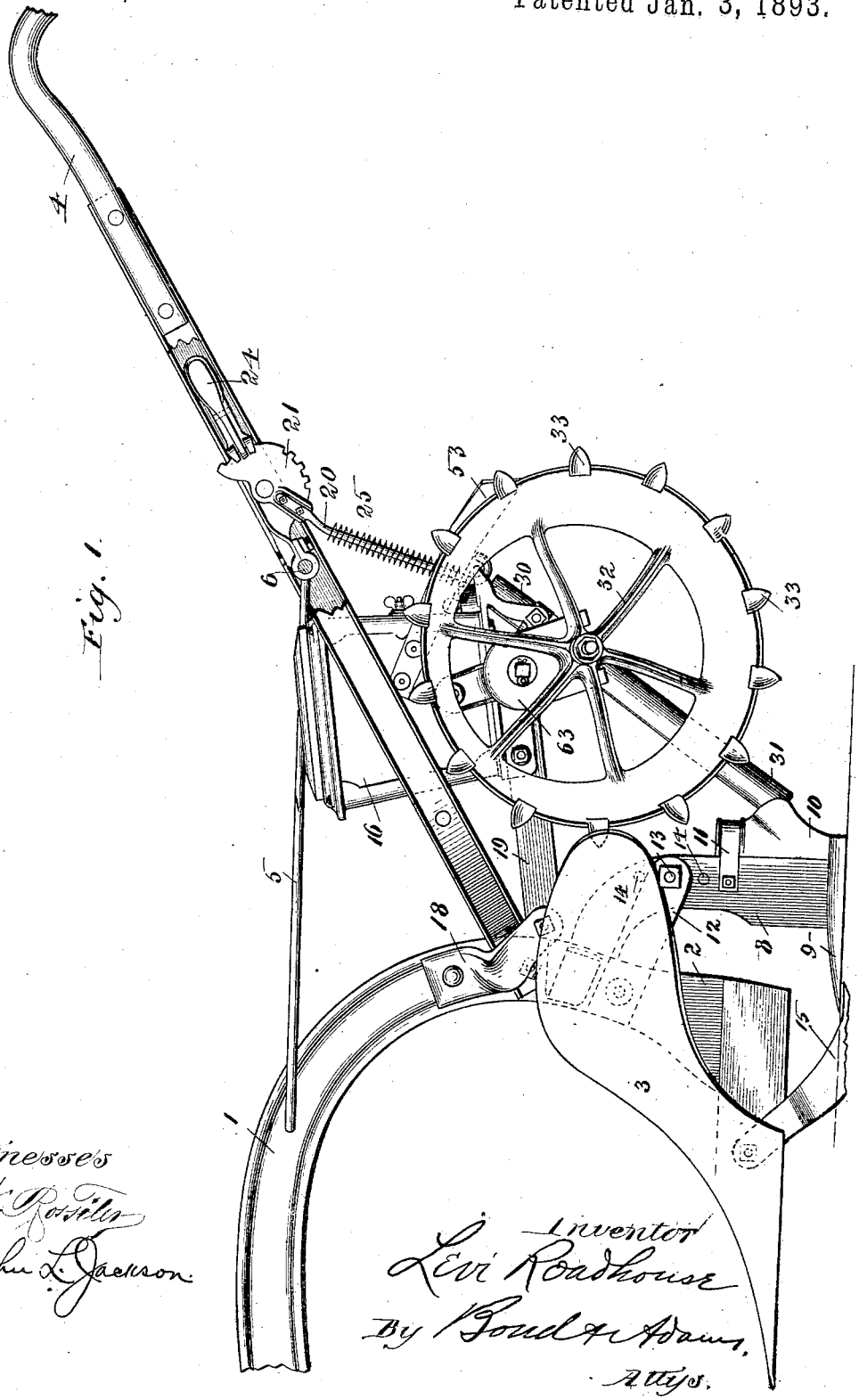
Figure 2:
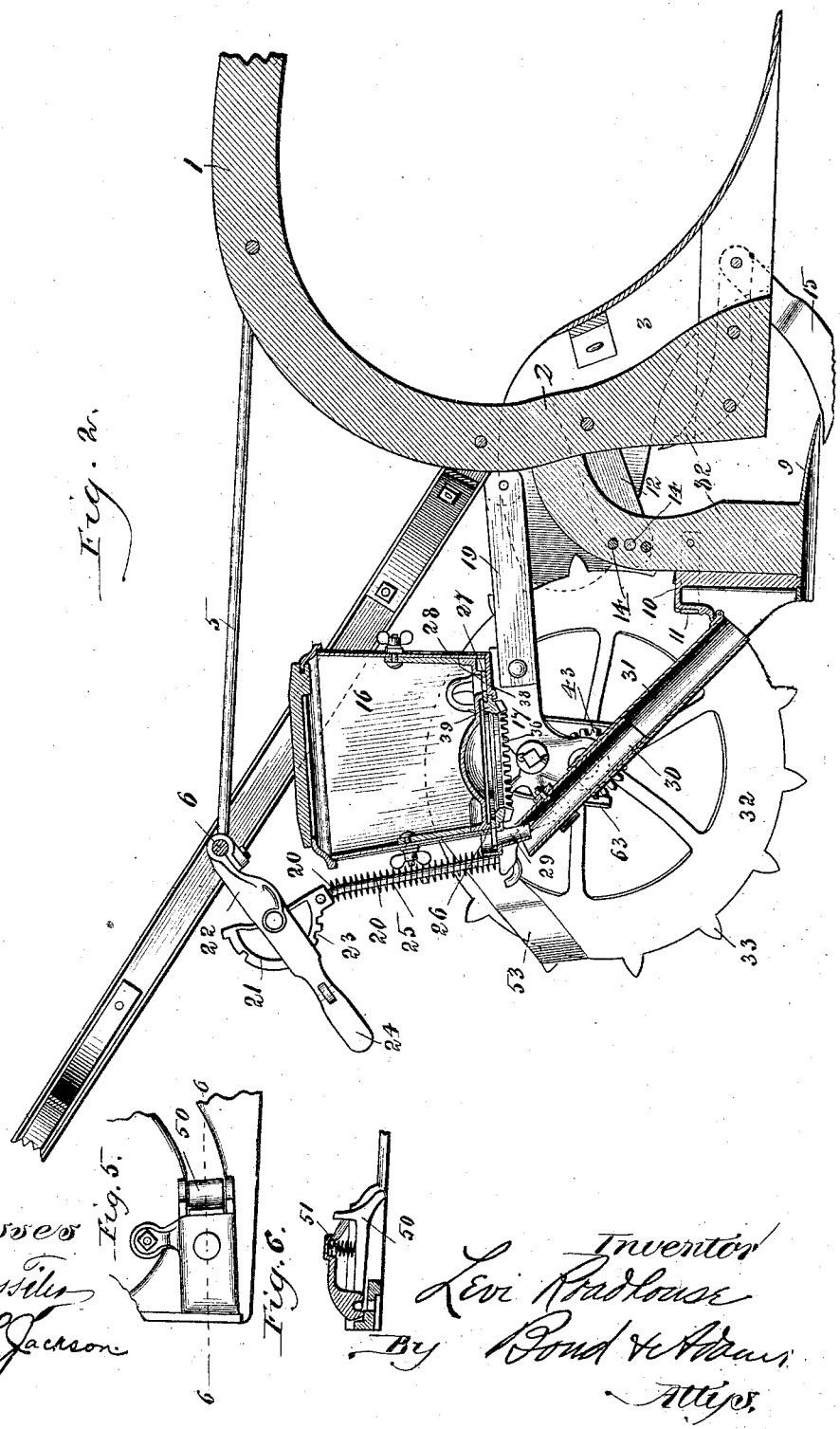
Figure 3:
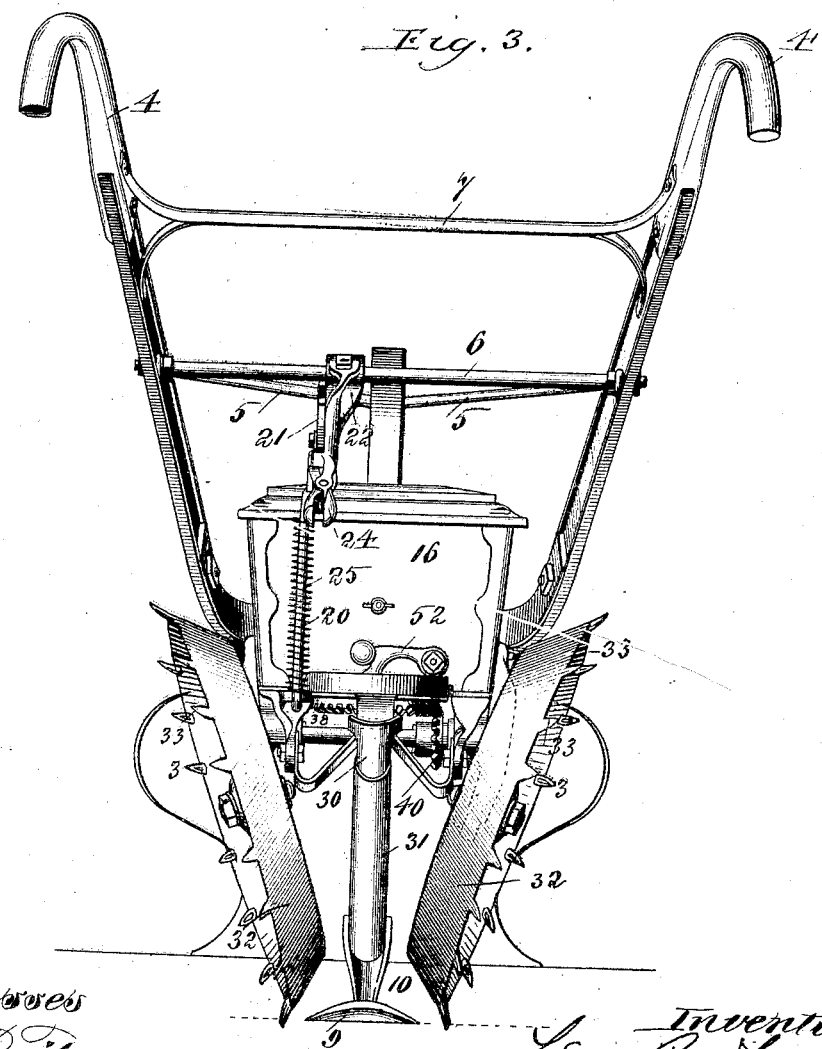

Figure 1 is a side elevation; Fig. 2 is a central longitudinal vertical section; Fig. 3 is a rear elevation; Fig. 4 is a central vertical cross section; Fig. 5 is a plan view of the feed regulator; and Fig. 6 is a section on line 6—6 of Fig. 5.

My invention relates to plows provided with an attachment for planting corn, and more especially to that class of plows which are provided with a subsoiler behind which the corn is dropped by mechanism operated by the motion of the plow.

The objects of my invention are to insure the covering of the seed after it has been planted; and to so plant and cover the seed that it will not be in danger of being washed out by the passage of water along the furrows. I accomplish these objects as illustrated in the drawings and as hereinafter specified.

That which I regard as new will be set forth in the claims.

In the drawings,—1, indicates the plow beam, which is bent at its inner end to form a standard, 2, upon which is secured a double mold-board 3, which may be of any suitable pattern.

4, indicates the handles of the plow, which may be of the usual pattern, and are firmly secured to the standard 2 in any suitable manner.

5, 6, and 7, indicate braces, the braces 5 extending from the handles 4 to the back portion of the plow beam, and the braces 6 and 7 connecting the two handles of the plow, as shown in Fig. 3.

8, indicates a subsoil standard, which at its upper end is secured to the standard 2 and extends downward back of the standard 2 to a point slightly below the shares at the bottom of the mold-board 3, as best shown in Figs. 1 and 2.

Secured to the standard 8 is a subsoiler 9, which is provided at its rear end with an upward extension 10 by means of which it is secured to the standard 8. The extension 10 of the subsoiler is of the shape shown in Fig. 3, being hollowed out at the back, and is secured at its upper end to the standard 8 by a strap 11, as best shown in Fig. 1.

In order that the depth of the subsoil furrow may be varied, the upper end of the standard 8 is adapted to move upon the standard 2, and the standard 8 is firmly secured in its upright position by means of a strap 12 firmly secured at one end to the standard 2, and at the other end secured to the standard 8 by means of a bolt 13 which passes through the strap and through suitable holes in the standard 8. Several holes 14 are provided in the standard 8, as best shown in Fig. 2, so that by removing the bolt 13 the standard 8 may be adjusted upon the standard 2, so that the depth of the subsoil furrow may be regulated.

15, indicates a knife or colter, which is bolted to the frog of the mold-board 3, and extends downward in front of the point of the subsoiler 9. The lower edge of the knife 15 is sharpened, to adapt it to cut away any weeds or obstructions to prevent them from accumulating upon the subsoil standard.

16, indicates a seed-box, which is mounted upon a frame 17, as best shown in Fig. 2. The seed box is adapted to contain a supply of the seed to be planted, and is provided at its bottom with the mechanism for dropping the seed, which will be hereinafter described. The frame 17 upon which the seed box is supported is pivotally connected at its front end to two brackets 18 by means of straps 19, each of which is pivoted at one end to the frame 17 and at the other to one of the brackets 18. The brackets 18 are rigidly secured to the upper portion of the standard 2, as best shown in Fig. 1. The rear end of the frame 17 is supported from the brace 6, by means of a connecting rod 20, bracket 21, and lifting lever 22, as best shown in Fig. 2. The lower end of the connecting rod 20 passes through a suitable lug on the rear end of the frame 17, as best shown in Fig. 2. This construction permits of any necessary vertical play of the frame 17. The upper end of the rod 20 is connected to the bracket 21. The bracket 21 is of segmental shape, and is provided with notches 23 upon its periphery. The bracket is pivotally connected to the lever 22, which lever is pivoted upon the rod 6, as shown.

24, indicates a spring pawl, which is mounted upon the lever 22, one end of which is adapted to engage notches 23 upon the bracket 21, so that the lever may be locked at different positions upon the bracket.

25 indicates a spring which is placed upon the rod 20, as best shown in Fig. 2. The upper end of the spring bears against the bracket 21 and its lower end upon the lug, on the rear end of the frame 17, through which the rod 20 passes. By this construction the spring 25 acts to hold the frame 17 at the lower end of the rod 20 and thereby causes the covering wheels to press harder upon the ground.

The feed box 16 is provided at the lower portion of its rear end with a slot 26, as best shown in Fig. 2. A flat disk or ring 27 is mounted in the bottom of the box 16 in such position that a small portion of it will project through the slot 26. The disk 27 is provided at suitable points near its periphery with holes 28, and the disk is so mounted in the box 16 that as the disk is revolved the holes 28 will successively pass through the slot 26 to the outside of the box.

29, indicates a tube, which is secured at the back of the box 16 at a point opposite the slot 26, as best shown in Fig. 2, and projects downward, as shown. The upper portion of the tube 29 is made of the shape shown in Fig. 3, being adapted to form a case in which the disk 27 may move. The lower end of the tube 29 extends into a tube 30, which is secured to the lower portion of the frame 17, and extends forward and downward and is incased at its lower end in a similar tube 31, as best shown in Fig. 2. The tube 31 is secured at its lower end to a portion of the extension 10 of the subsoiler 9, and terminates at its lower end a short distance above and back of the rear end of the subsoiler 9, as shown, its upper end incasing the lower end of the tube 30, as above mentioned. The tube 30 is adapted to move in the tube 31, which construction is necessary to permit of the frame 17 being raised and lowered, as the tube 31 is secured to a stationary part of the plow, while the tube 30 is secured to the frame 17. By this construction, when the seed is delivered from the tube 29 into the tube 30, it will pass forward and downward and will be delivered upon the ground a short distance back of the rear end of the subsoiler 9. Owing to the arrangement of the subsoiler and delivery tube, the seed will fall upon the loose dirt which fills in behind the subsoiler, instead of on the hard ground, as would be the case if the seed were delivered behind and close to the subsoiler, as in constructions heretofore used.

32, indicates two wheels for operating the feeding devices and for covering the seed. The wheels 32 are preferably made of iron or steel, and are provided with inclined tires, as best shown in Figs. 3 and 4 to adapt them for covering the seed. Projections 33 are provided at suitable points upon the outer edges of the tires, as shown in the drawings, which projections are adapted to enter the ground to insure the rotation of the wheels and the regular operation of the feeding devices.

The wheels 32 are journaled upon axles 34, which are mounted in brackets 35 depending from each side of the frame 17, as best shown in Fig. 4. The outer ends of the axles 34 are inclined downward and backward, whereby the rear portions of the wheels 32 are closer together than the forward portions, the object of which construction will be hereinafter more fully described. The axles 34 preferably consist of chilled sleeves 55, which are adapted to receive the journals of the wheels 32. The sleeves 55 are supported by cores 56, which are secured in the brackets 35, as best shown in Fig. 4. The cores 56 preferably consist of bolts of suitable size, having heads 57 at their inner ends, and being screw-threaded at their outer ends to receive nuts 58, by means of which the wheels 32 may be secured upon their axles. The bolts are supported in the brackets 35 by being inserted through suitable holes in the brackets from the inside. The holes through which the bolts 56 pass are preferably square or of irregular shape, and the ends of the bolts next to the heads 57 are correspondingly shaped, so that the bolts will be prevented from turning when the nuts 58 are being screwed upon them.

59, indicates collars, which are formed upon the inner ends of the sleeves 55, which collars are adapted to fit into suitable recesses in the brackets 35 to hold the sleeves more securely in position. The bolts 56 are provided with fins 60, which are adapted to engage the inner surfaces of the sleeves 55, to prevent them from being rotated by the rotation of the wheels 32. By this construction, if the sleeve 55 should wear out or in any way become unfitted for use, it may readily be removed and replaced.

36, indicates a beveled gear wheel, which is mounted at the bottom of the seed box 16, as best shown in Fig. 4, being held in place by a flange 37, which is engaged by a plate 38 which forms the bottom of the box 16. The upper side of the gear wheel 36 is provided with lugs 39, which fit in suitable recesses in the disk 27, as best shown in Fig. 2, whereby by the rotation of the wheel 36 the disk 27 will also be rotated. The wheel 36 is operated by means of a beveled pinion 40, which is keyed upon a shaft 41, which extends horizontally under the seed box 16, as best shown in Fig. 4. The shaft 41 is rotated by means of pinions 42, one of which is keyed to each end of the shaft, and which are adapted to mesh with pinions 43 which are keyed to the inner portions of the hubs of the wheels 32, as best shown in Fig. 4. By this construction, by the rotation of the wheels 32 the wheel 36 and disk 27 will be rotated in a horizontal plane.

61, indicates plates, one of which is secured at each side of the seed box 16, preferably by means of bolts 62, as best shown in Fig. 4. The plates 61 project downward, and are provided at their lower ends with forked arms 63, which extend on each side of the axle 34 on the outside of the pinions 42 and 43. The object of the plates 61 is to prevent the said pinions, especially the pinions 43, from sliding out of place when the wheels 32 are removed from the axle.

44, indicates a plate for holding the disk 27 in position, and for feeding the seed upon said disk. The plate 44 consists of an outer portion 45 and an inner portion 46, which are connected by means of curved arms 47, as best shown in Figs. 2 and 4. The portion 46 of the plate 44 is adapted to cover the central portion of the disk 27, as shown. In order to prevent the plate 44 from bearing upon the disk 27, it is supported by means of pins 54, which are of such length that they will hold the plate a short distance above the disk 27, as best shown in Fig. 4. At suitable points upon the edges of the plate 44 are lugs 48, which project upward a short distance, and are flat on their upper surfaces.

49, indicate hooks or cams, which are pivoted to the sides of the seed box over the lugs 48, and are adapted, when turned downward, to engage the lugs 48 to firmly bind the plate 44 in position. When it is desired to remove the plate 44, the hooks 49 may be turned upward, and the plate may then be readily removed.

Secured upon the plate 44 at a point near the slot 26, is a feed regulator or cut off 50, which consists of a finger so placed that as the disk 27 revolves, the holes 28 will pass under the finger, and the seed in the hole 28 of the disk 27 will be leveled off, so that only an amount of seed sufficient to fill the hole 28 will be delivered to the tube 29 by each of the holes. If it is desired to vary the amount of seed dropped, a disk 27 having larger or smaller holes may be used. The finger 50 is held downward by a spring 51, as best shown in Fig. 6, by which construction the finger may be moved upward if it should strike any obstruction, and breakage of any of the parts will thereby be prevented.

52, indicates a pawl, or ejector which is preferably of the shape shown, and is pivotally mounted at the back of the box 16, as best shown in Fig. 3. The lower end of the pawl is adapted to enter one of the holes 28 in the disk 27, and is so shaped that when the pawl is in one of the holes 28 and the disk is rotated by the operation of the machine, the pawl will pass out of said hole. This is preferably accomplished by making the lower end of the pawl beveled. When the machine is in operation, as each one of the holes 28 passes under the pawl it will drop successively into each hole, and will force out the seed if it should happen to stick in the hole. This insures the regular dropping of the seed.

When it is desired to use the planting attachment, the lever 22 is drawn downward to the position shown in Fig. 2. The projections 33 upon the wheels 32 will then enter the ground, and as the plow is moved the wheels 32 will be caused to rotate, the projections 33 preventing any slipping of the wheels. As the wheels rotate, the disk 27 will also be rotated, as hereinbefore described, and a supply of seed sufficient to fill one of the holes 28 will be delivered at the tube 29, and will pass downward through the tubes 30 and 31, and will be delivered upon the ground in the furrow back of the subsoiler. Owing to the construction of the extension 10 of the subsoiler, the seed will be delivered a short distance back of the rear portion of said subsoiler, so that it will fall upon the loose dirt which falls back of the subsoiler, and not upon the hard ground beneath, as would be the case if the seed were delivered immediately back of the subsoiler. By inclining the tires of the wheels 32 as shown, the earth will be pressed over the planted seed into the form of a ridge, and by making the wheels so that their rear portions will be closer together than their forward portions, as shown, they will tend to throw the dirt into a ridge over the planted seed. By planting seed in this way, the danger of its being washed out by water running along the furrows will be avoided.

In order to avoid the possibility of a failure to regularly drop the seed, the shaft 41 which carries the beveled pinion 40 is geared to each of the wheels 32, so that in case one of said wheels should slip, the shaft may be rotated by the other wheel alone. The pawl or ejector 52 forces the seed from the holes 28 into the delivery tube.

53, indicates scrapers, which are preferably attached to the box 16, and are adapted to scrape the dirt from the tires of the wheels 32.

When it is not desired to use the planting attachment, the wheels 32 with the box 16 are raised by raising the lever 22 to the position shown in Fig. 1.

That which I claim as new and desire to secure by Letters Patent, is,—

1. The combination with a plow, of a vertically adjustable subsoiler, seed-delivery mechanism pivotally connected with said plow, a telescopic tube connected with said pivotally connected seed delivery mechanism and said vertically adjustable subsoiler for delivering seed to the ground, a lever for elevating said seed-delivery mechanism out of operation and a spring for retaining the same normally in operative position, substantially as described.

2. The combination with a plow, of a frame 17, pivoted at its forward extremity to the plow, a brace, as 6, a lifting lever 22 turning on said brace, a bracket 21, a rod 20, connected at its upper end to said bracket and at its lower end to the rear of the pivoted frame 17, a spring 25 upon the rod 20, bearing at its lower end against the said frame 17, and seed delivery mechanism supported upon said frame 17, substantially as described.

3. The combination with a plow, of a frame 17 pivoted at its forward extremity to the plow, a brace 6, extending between the handles of the plow, a lever 22 turning on said brace, a bracket 21, a rod 20 connected at its upper end to said bracket and at its lower end to the rear of the pivoted frame 17, a spring 25 upon the rod 20, bearing at its lower end against said frame 17, a seed delivery mechanism supported upon said frame 17, a subsoiler 9, and a telescopic tube 30 31, secured to said frame 17 and said subsoiler 9, substantially as described.

4. The combination with a plow, of a seed delivery mechanism pivoted thereto, combined covering and seed delivery mechanism operating wheels, said wheels inclining inward from front to rear and top to bottom, having inclined or beveled tires and provided with projections extending from their running surface, substantially as described.

5. The combination with a plow having a brace 6 connecting its handles and an adjustable subsoiler 9 having a rearward extension 10, of a frame 17 pivoted at its forward end to the plow and formed at its rear with a lug, seed delivery mechanism and combined covering and seed delivering mechanism operating wheels carried by said frame 17, a telescopic tube 30, 31, connected with said frame 17 and the rearward extension 10 of the subsoiler, a lever 22, turning on the brace 6, a bracket 21, pivoted to said lever, a rod 20, secured at its upper end to said bracket and at its lower end to the lug on the rear of the frame 17, and a spring 25, on said rod 20 for the purpose of pressing the seed delivery mechanism and wheels to their operative position, substantially as described.

6. The combination of a plow and seed delivery mechanism carried thereby, with combined covering and operating wheels, said wheels being inclined from top to bottom and being provided with projections extending from their landing surface to prevent slipping and secure regularity of work, substantially as described.

LEVI ROADHOUSE.

Witnesses:
HERBERT E. REED,
D. P. PHELPS.